Nov. 19, 1968
P. P. YEH
3,412,199
ELECTRIC POWER TRANSMISSION CABLE
Filed Jan. 12, 1967
2 Sheets-Sheet 1
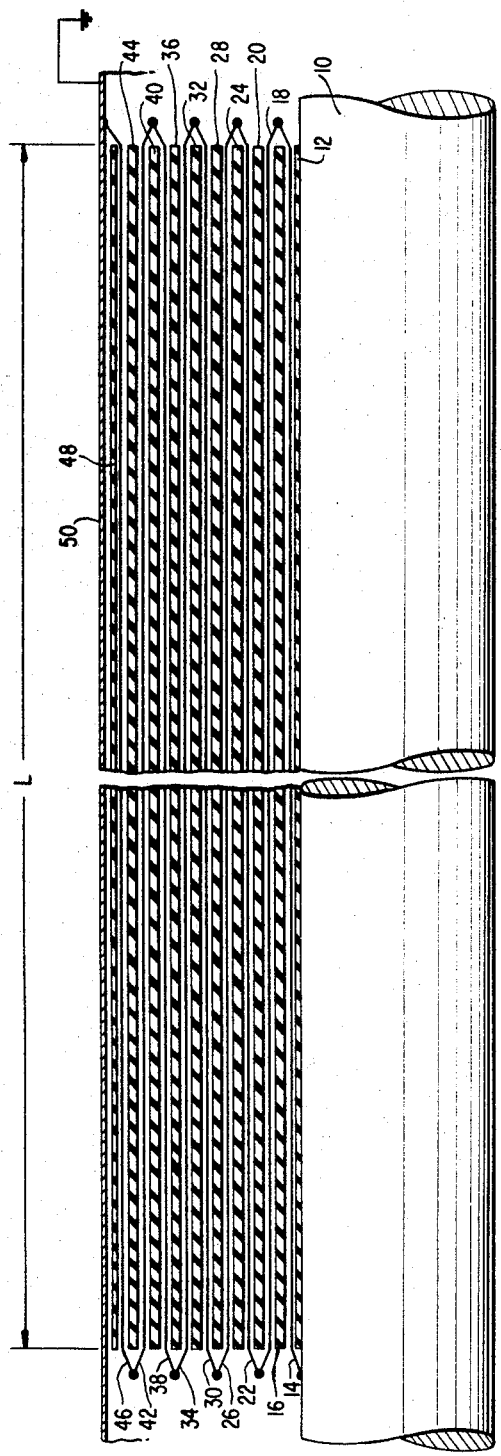
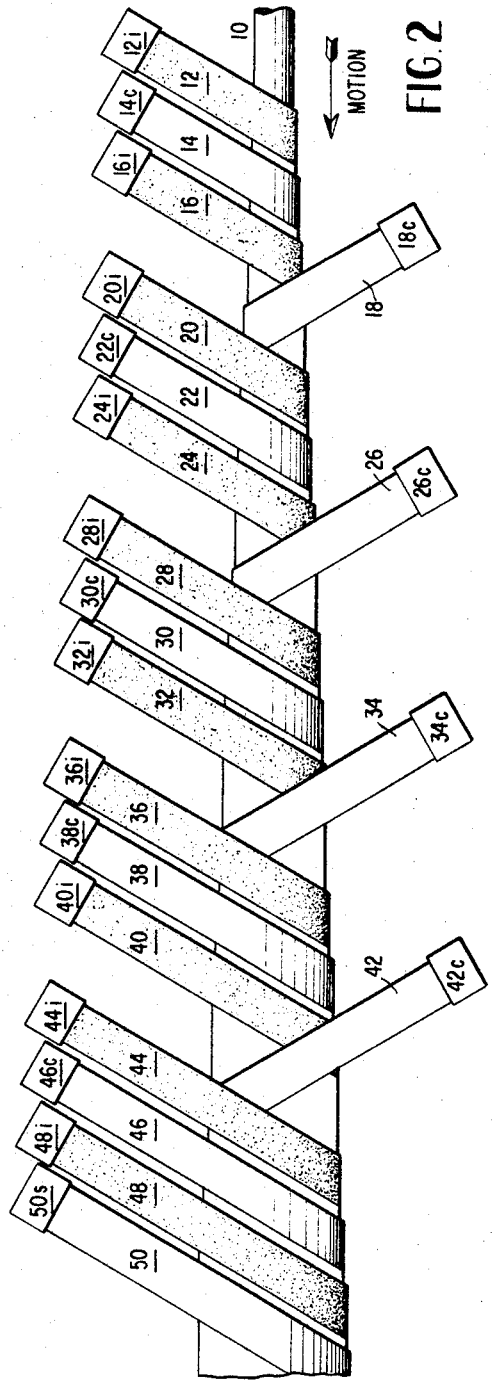
PAUL P. YEH, INVENTOR
BY *Stowell & Stowell*
ATTORNEYS Nov. 19, 1968 P. P. YEH 3,412,199
ELECTRIC POWER TRANSMISSION CABLE
Filed Jan. 12, 1967 2 Sheets-Sheet 2
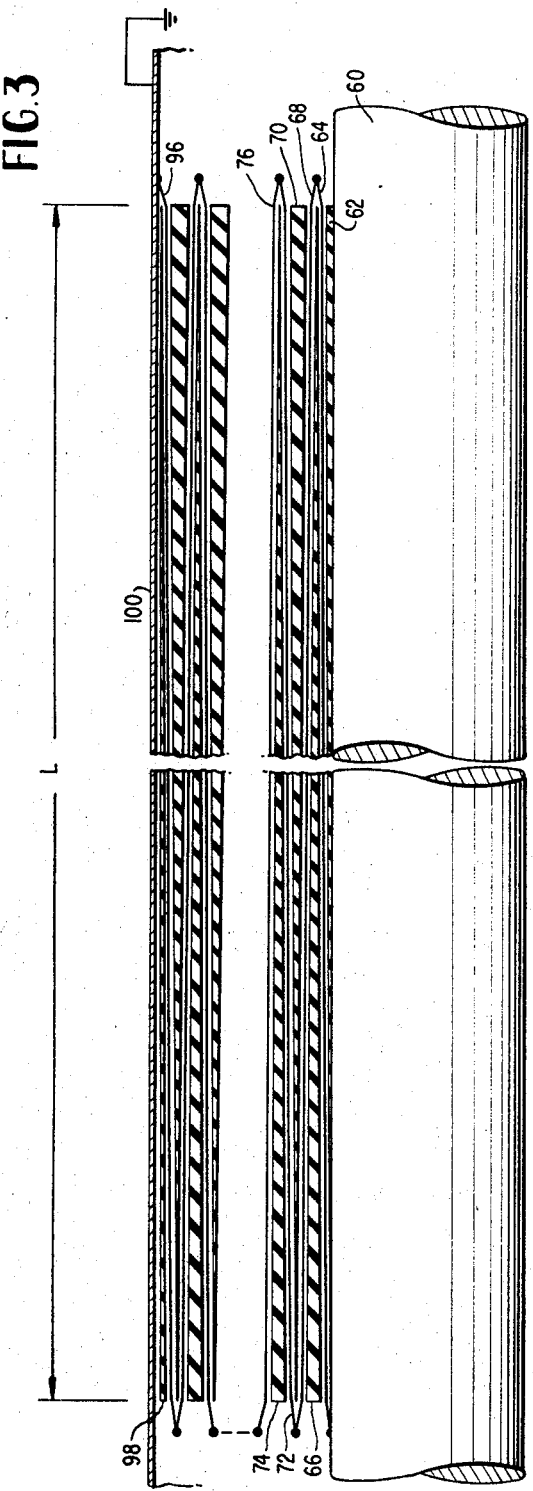
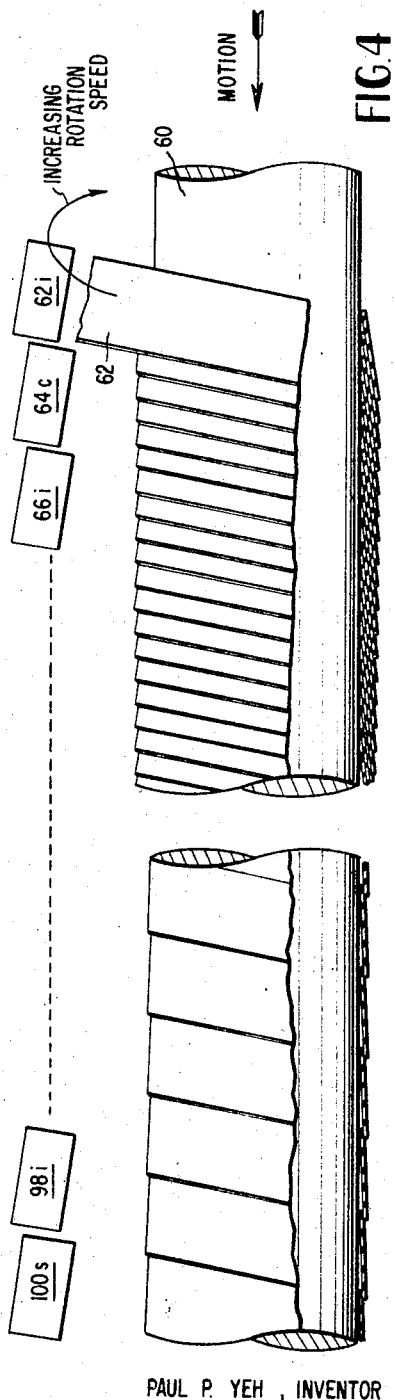
PAUL P. YEH, INVENTOR
BY *Stowell & Stowell*
ATTORNEYS United States Patent Office
3,412,199
Patented Nov. 19, 1968

3,412,199
ELECTRIC POWER TRANSMISSION CABLE
Paul P. Yeh, Westminster, Calif., assignor, by mesne assignments, to Research Corporation, New York, N.Y., a nonprofit corporation of New York
Filed Jan. 12, 1967, Ser. No. 608,923
8 Claims. (Cl. 174—32)

ABSTRACT OF THE DISCLOSURE

A high voltage power cable is provided with alternate conductive windings sandwiched between correspondingly alternate insulating layers. The conductive windings are connected together to define a serial/zig-zag electrical path from a central conductor to an external sheath, the sheath adapted to be coupled to ground. This structure yields an inductance in parallel with a capacitance, thereby reducing to a minimum the charging current required on account of electrical capacitance due to the geometry of power cables.

---

This invention relates to a high voltage power transmission cable and more particularly to a power transmission cable which does not require a large charging current due to an unbalanced reactance.

High voltage power transmission cables used in underground transmission systems are often formed with many layers of concentric paper or other insulation wound over the inner or main conductor, usually a copper conductor. A conductive shield or sheath is then placed around the outermost layer of insulation and the sheath then connected to an appropriate external ground. The capacitive effect at high voltages between the main conductor and the ground is usually, in such constructions, pronounced. For a typical 345 kv. cable the voltage between the main conductor and the ground is approximately 200 kv. and the capacitance is approximately .378 microfarad per mile. In order to charge a typical 345 kv. underground cable, a current which may be as high as 28.3 amperes per mile is required. In other words, it would require 17,000 kvar. to charge one circuit mile of such a high voltage transmission cable. To compensate for this undesired charging current, power companies often build expensive reactor stations at the sending and receiving ends of the transmission line. Further, it often occurs that additional shunt reactor stations must be installed somewhere between the ends of the transmission lines. Such a method of compensation results in a lumped reactive system and does not completely solve the charging current problem because the combination of lumped inductive reactances at the various external stations and the uniformly distributed capacitance in the cable will not eliminate the charging current along the cable. Further, switching in the reactor stations often causes transient instability.

In accordance with the practice of this invention, these disadvantages are overcome by a novel cable construction wherein inductance is built directly into the cable and accordingly compensates for the high capacitance of the cable. For a specific unit length of a high voltage transmission cable according to this invention, the cable will exhibit a shunt inductance and a shunt capacitance in parallel. In this manner at a resonant frequency there will accordingly be minimum current required to charge the cable. By virtue of the subject cable construction, it will be apparent that expensive shunt reactor stations heretofore often employed will not be required.

In the drawings:

FIG. 1 is a partial cross sectional view, broken away longitudinally, of a high voltage transmission cable according to one embodiment of the present invention.

FIG. 2 is a partially schematic view showing a method of fabricating the cable of FIG. 1.

FIG. 3 is a view similar to FIG. 1 showing a second embodiment of a high voltage transmission cable.

FIG. 4 is a view similar to FIG. 2 illustrating a portion of the steps followed in fabricating the cable of FIG. 3.

Referring now to FIG. 1 of the drawings, the numeral 10 denotes a main conductor which may assume the form of a bare copper cable with a plurality of steel wires (not illustrated) running through the central portion thereof. The steel wires, for a purpose which will become apparent, increase the inductance of the cable. The numeral 12 denotes a layer of insulation, commonly formed of paper, which is wound on the main conductor 10. The paper insulation 12 may be in the form of a ribbon or band and is wound on the conductor 10 to form a layer thereon, thus yielding a single thickness layer 12 equal to the thickness of a single ribbon of the insulating material. The letter L denotes an appropriate unit length which carries the built-in inductive elements (to be described), it being understood that the entire length of the finished high voltage transmission cable is a multiple of the basic unit length L. Stated somewhat differently, the entire cable is made up of a continuous main conductor 10 upon which is placed a series of built-in modular reactive elements, with each module of the series being of length L.

The numeral 14 denotes a spiral conductive winding conveniently formed of copper or aluminum tape. It will be observed that one end of the conductive tape, the left end of FIG. 1, is electrically secured to the main conductor 10. The numeral 16 denotes a second insulation layer, of a thickness twice that of a first layer 12. The numeral 18 denotes a second conductive winding, similar to the first conductive winding 14 and it will be observed that the right hand end of winding 18 is secured to the right hand end portion of winding 14. The voltage between the main conductor 10 and the first conductive winding 14 (considering the voltage drop to be uniform over the length L) will be one-half the voltage between the first and second windings 14 and 18, thus accounting for this different insulator thickness. Succeeding alternate windings of conductive tape and insulation layers will be readily visualized by the reader by recourse to FIG. 1 and no further description will be offered except to note that the radially outermost conductive winding 46 is separated from the conductive sheath 50 by a layer of unit thickness of insulation 48, the same thickness of the first insulation layer. It will further be observed that the radially outermost conductive winding 46 is electrically secured to the sheath 50, with the sheath 50 being grounded in actual use. The thickness of the other insulating sheaths such as 40 and 44 are double unit thickness. It is also to be observed that the various windings of conductive tape are electrically joined at their ends to thereby define, as viewed in FIG. 1, a generally zig-zag configuration. FIG. 1 discloses only one-half of a longitudinal cross-section of the transmission cable, the other half not being illustrated for purposes of clarity.

Referring now to FIG. 2 of the drawings, a method of fabricating the high voltage transmission cable of FIG. 1 is schematically indicated. The main conductor 10 is moved from right to left as indicated by the arrow. A plurality of winding heads each adapted to execute circular motion at right angles to the longitudinal axis of the conductor 10 are schematically indicated. The first rotating head or header is denoted by the numeral 12$i$ and as the conductor moves from right to left it will commence winding the first insulator layer 12 on the conductor 10, the latter moving at uniform speed. The rotating head 12*i* will tape the central conductor 10 and form the insulation on the innermost layer to a thickness equal to the thickness of the tape 12. At a longitudinal distance along the conductor 10, a second rotating head 14*c* is located and winds a conductive tape 14 formed for example of aluminum or copper, as above noted. At the next axial station, a rotating header 16*i* wraps a double thickness of the paper or other insulating tape 16. At the next axial station rotating header 18*c* will wrap, in a counter rotational direction, the winding 18, formed of the same aluminum or copper tape. The reader will now be in a position to comprehend that the succeeding axial headers bear the subscripts *i* and *c*, respectively, denoting the insulator and conductor headers and that all of the insulating tapes except the radially innermost 12 and the radially outermost 48 are of double thickness, for the reason previously given. It will be observed that alternate radial windings of conductive tape, such as 14, 18, 22, 26, etc., are wound in a direction counter to the conductive tapes immediately adjacent them.

The last axial header 50*s* is employed to wrap the conductive sheath 50. It will be apparent that the direction of winding of the insulating layers 12, 16, 20, etc., is arbitrary, in that their directions may be all the same or alternately counter directional. Further, the precise manner of electrically joining the ends of the conductive tapes of the successive windings is arbitrary, just as is the manner of electrically coupling the first conductive winding 14 to the conductor 10 and the last conductive winding 46 to the sheath 50. It will be found convenient however to wind the conductive windings to a length slightly greater than L to facilitate their connection. As stated previously, the resultant high voltage transmission cable exhibits a main curent path defined by conduit 10 which has a shunt inductance defined by the helically wound conductor windings and a shunt capacitance due to the geometry of the cable. Accordingly, the current required to charge the main conductor at the resonant frequency, in the form of the invention shown and described, will be approximately zero.

Referring now to FIG. 3 of the drawings, a second embodiment of the invention is illustrated wherein a main conductor 60, similar to conductor 10 of the embodiment of FIG. 1, is provided with a first radially innermost insulating layer 62. It will be observed that layer 62 is not of uniform thickness, rather its thickness increases uniformly passing from left to right viewed in FIG. 3 over the unit length L. The material which forms the first insulating layer 62 is similar to the material in the previously described embodiment, i.e., material formed from a paper or other suitable insulator.

The numeral 64 denotes the radially innermost conductor winding having one end electrically joined to the main conductor as indicated. The numeral 66 denotes the second radially innermost insulating sheath or layer, also uniformly axially varying in thickness and it will be observed that this sheath may have a maximum thickness twice that of the greatest thickness of the first layer 62, for the same reason as that of the first embodiment. As the voltage between the main conductor 60 and conductor 64 increases, the required insulation thickness also linearly increases, and accordingly the insulation layers are tapered. The numeral 68 denotes the second radially innermost helical conductor winding and it will be observed that one end thereof is electrically connected to one end of the first conductor winding 64. From this, the reader will readily visualize that the remaining radially outwardly extending insulator and conductor windings are built up in a similar manner, with each insulating layer being tapered as above-described and for the stated reason. The last insulation layer, arbitrarily denoted by the numeral 98, is of the same greatest thickness at one of its ends as the first layer 62. Further, the radially outermost conductive winding 96 is electrically connected at one end to the conductive sheath 100, the latter being grounded as indicated. The electrical connections between the conductive windings form, as in the previously described embodiment, a generally back and forth electrical pathway.

In this embodiment the same electrical characteristics will be recognized as those in the previously described embodiment, i.e., for the unit length L of the cable, the cable will have a shunt inductance and a shunt capacitance in parallel and at a resonant frequency, there will be minimum current required to charge the cable.

Referring now to FIG. 4 of the drawings, one method of forming the cable according to this second embodiment of the invention is illustrated. The main conductor 60 is moved in the direction of the arrow from the right to the left at a constant speed. A rotating header 62*i* revolves about the longitudinal axis of the conductor 60 in a plane at right angles to the plane of the drawing. The initial rate of rotation, i.e., angular velocity, of the wrapping header 62*i* is relatively slow, there being only a partial overlap of adjacent insulating strips 62. This is seen at the left portion of FIG. 4. As the conductor 60 continues its motion from right to left, the angular velocity of header 62*i* increases, thereby increasing the overlap of the insulator tape or strip 62 until, as illustrated at the right portion of FIG. 4, there is considerable overlap.

The numeral 64*c* denotes a second header also revolving around the longitudinal axis of the main conductor 60 in a plane at right angles to the plane of the drawings. This header deposits the first conductive winding 64, the winding being formed of the same aluminum or copper tape as that described previously. That is to say, the header 64*c* deposits the conductive winding 64, the latter defined by wrapping a plurality of whorls or turns of conductive tape to thereby define a helix.

At the next station, header 66*i* rotates at an initially high angular velocity down to a lower angular velocity, such that the insulating layer 66 exhibits the cross-sectional shape illustrated, i.e., this layer is thin at the right hand portion of FIG. 3 and reaches its maximum thickness at the left hand portion.

The reader will now be in a position to visualize that the next conductor header 68*c* (not illustrated) will rotate about the longitudinal axis of 60, here in a direction counter to that of conductor header 64*c*. Thus, as in the embodiment of FIG. 1, adjacent conductive windings will be wound in opposite directions. Further, again similar to the previously described embodiment, the direction of rotation of the headers which carry the insulating tape is not critical, i.e., the various layers of insulating tape may be wound in any desired direction. Further, the insulating layers intermediate the radially innermost and radially outermost layers are of a double thickness with respect to these layers. The last station of FIG. 4, denoted by 100*s*, may be employed to wrap the outer conductive sheath 100. It will be apparent that the conductive windings in each of the two embodiments described are each defined by a conductive tape or band spirally wound between insulating layers. While conductive tapes have been illustrated as defining the various conductive windings, it is within the scope of the invention to employ wires. It is also within the scope of the invention to employ conductors defined by aluminum deposited on an insulating tape such as Mylar.

What is claimed is:

1. A high voltage electrical transmission cable comprising, a central conductor, a conductive sheath surrounding and radially spaced from the surface of said central conductor to thereby define an annular space therebetween, a plurality of alternate insulator layers, conductor windings disposed radially outwardly of the central conductor and radially spaced from each other, the radially innermost insulator layer contacting the surface of the central conductor, the radially outermost insulation layer contacting the inner surface of said sheath, the radially innermost conductor winding electrically connected to said central conductor, the radially outermost conductor winding electrically connected to said sheath, the remaining conducting windings electrically connected to each other.

2. The transmission cable of claim 1 wherein one end of said innermost conducting winding is connected to said central conductor, one end of said outermost conductor winding is connected to said sheath, opposite ends of said conductor windings being serially electrically connected to thereby define a single alternately back and forth electrical path from the central conductor to the sheath.

3. The transmission cable of claim 1 wherein the said innermost and said outermost insulator layers are of a lesser thickness than the remaining insulator layers.

4. The cable of claim 1 wherein the thickness of the insulator layers varies axially uniformly therealong, the thinnest end of one said insulator layer axially disposed coincident with the thickest end of an adjacent insulator layer.

5. The cable of claim 2 wherein the thickness of the insulator layers varies axially uniformly therealong, the thinnest end of one said insulator layer axially disposed coincident with the thickest end of an adjacent insulator layer.

6. The cable of claim 3 wherein the thickness of the insulator layers varies axially uniformly therealong, the thinnest end of one said insulator layer axially disposed coincident with the thickest end of the adjacent insulator layer.

7. A high voltage electrical transmission cable comprising a central conductor, a conductive sheath surrounding and radially spaced from the surface of said central conductor to thereby define an annular space therebetween, a plurality of modular units axially spaced along said cable and axially spaced from each other, each modular unit comprising a plurality of alternate insulator layers, conductor windings extending radially outwardly from the central conductor and radially spaced from each other, the radially innermost conductor winding electrically connected to said central conductor, the radially outermost conductor winding electrically connected to said sheath, the remaining conductor windings electrically connected to each other.

8. The cable of claim 7 wherein for each said modular unit opposite ends of said conductor windings are serially electrically connected to thereby define a single alternately back and forth electrical path from the central conductor to the sheath.

References Cited

UNITED STATES PATENTS

| 2,686,904 | 8/1954 | Feder | 174—127 X |
| 3,299,384 | 1/1967 | Hua-Tung Lee | 336—69 X |

FOREIGN PATENTS

| 537,560 | 12/1955 | Italy. |
| 53,375 | 12/1933 | Norway. |

LEWIS H. MYERS, *Primary Examiner.*

A. T. GRIMLEY, *Assistant Examiner.*